(12) United States Patent
Krishnan et al.

(10) Patent No.: US 10,708,843 B2
(45) Date of Patent: Jul. 7, 2020

(54) METHODS AND APPARATUSES FOR BEACON ASSISTED LOW POWER LOCALIZATION

(71) Applicant: LGS INNOVATIONS LLC, Herndon, VA (US)

(72) Inventors: Parameshwaran Krishnan, Basking Ridge, NJ (US); Krishan Sabnani, Westfield, NJ (US)

(*) Notice: Subject to any disclaimer, the term of this patent is extended or adjusted under 35 U.S.C. 154(b) by 138 days.

(21) Appl. No.: 15/840,371

(22) Filed: Dec. 13, 2017

(65) Prior Publication Data

US 2019/0037469 A1 Jan. 31, 2019

Related U.S. Application Data

(60) Provisional application No. 62/538,239, filed on Jul. 28, 2017.

(51) Int. Cl.
| | |
|---|---|
| *H04W 40/20* | (2009.01) |
| *G06F 3/048* | (2013.01) |
| *H04L 9/30* | (2006.01) |
| *H04B 5/00* | (2006.01) |
| *H04L 9/08* | (2006.01) |
| *H04W 84/12* | (2009.01) |

(52) U.S. Cl.
CPC ............ *H04W 40/20* (2013.01); *G06F 3/048* (2013.01); *H04B 5/0031* (2013.01); *H04L 9/083* (2013.01); *H04L 9/30* (2013.01); *H04W 84/12* (2013.01)

(58) Field of Classification Search
CPC ........ H04W 40/20; H04W 84/12; H04L 9/30; H04B 5/0031; G06F 3/048
See application file for complete search history.

(56) References Cited

U.S. PATENT DOCUMENTS

| | | | |
|---|---|---|---|
| 6,275,164 B1 | 8/2001 | MacConnell et al. | |
| 6,388,617 B1 | 5/2002 | Flood et al. | |
| 8,847,754 B2 | 9/2014 | Buchheim et al. | |
| 8,994,645 B1* | 3/2015 | Meehan ................ | H04W 4/029 345/156 |
| 9,622,208 B2 | 4/2017 | Mycek et al. | |
| 2008/0227473 A1* | 9/2008 | Haney .................... | H04W 4/21 455/457 |
| 2008/0316022 A1* | 12/2008 | Buck ..................... | G08B 21/02 340/539.13 |

(Continued)

*Primary Examiner* — Lewis G West
(74) *Attorney, Agent, or Firm* — Baker & Hostetler LLP (57) ABSTRACT

The present application is at least directed to an apparatus in a system including a non-transitory memory with instructions stored thereon for decoding a message from a beacon device. The apparatus also includes a processor, operably coupled to the non-transitory memory, configured to execute the instructions of receiving, via a deployment server, data about the system including a decryption key associated with the beacon device. The processor is also configured to execute the instructions of listening for a signal from the beacon device transmitted via low energy. The processor is further configured to execute the instructions of receiving the signal from the beacon device including encrypted information. The processor is even further configured to execute the instructions of decrypting the encrypted information including GPS coordinates. Another aspect of the application is directed to a beacon device in a disconnected system.

13 Claims, 10 Drawing Sheets

(56) References Cited

U.S. PATENT DOCUMENTS

| | | | |
|---|---|---|---|
| 2012/0050048 A1* | 3/2012 | Sandra | G01S 19/17 340/573.4 |
| 2012/0239942 A1* | 9/2012 | Yan | H04L 63/0421 713/189 |
| 2013/0225197 A1* | 8/2013 | McGregor | G01S 1/68 455/456.1 |
| 2013/0267245 A1* | 10/2013 | Shimizu | H04W 64/003 455/456.1 |
| 2014/0075181 A1* | 3/2014 | Raghupathy | H04L 63/0442 713/150 |
| 2014/0370917 A1* | 12/2014 | Buchheim | H04W 4/026 455/456.1 |
| 2015/0071440 A1* | 3/2015 | Raghupathy | G06F 21/6245 380/258 |
| 2015/0142551 A1* | 5/2015 | Papakipos | G06Q 30/0277 705/14.41 |
| 2015/0369618 A1* | 12/2015 | Barnard | H05B 47/19 701/491 |
| 2016/0173322 A1* | 6/2016 | Purpura | H04B 1/3822 370/216 |
| 2016/0259028 A1* | 9/2016 | High | B07C 5/3422 |
| 2017/0055112 A1* | 2/2017 | Westphal | H04W 4/029 |
| 2017/0188183 A1* | 6/2017 | Lihosit | H04W 40/244 |
| 2017/0347241 A1* | 11/2017 | Greenberger | H04W 4/029 |
| 2018/0082263 A1* | 3/2018 | Michels | G06Q 10/1095 |
| 2018/0184287 A1* | 6/2018 | Khan | G01S 5/02 |
| 2018/0192447 A1* | 7/2018 | DeLuca | H04W 4/50 |
| 2018/0199190 A1* | 7/2018 | Khan | H04L 63/0428 |
| 2018/0206100 A1* | 7/2018 | Eisner | H04M 1/72538 |
| 2019/0103030 A1* | 4/2019 | Banga | G08G 5/0013 |

* cited by examiner

Figure 6

METHODS AND APPARATUSES FOR BEACON ASSISTED LOW POWER LOCALIZATION

CROSS-REFERENCE TO RELATED APPLICATIONS

This application claims priority to U.S. Provisional Application No. 62/538,239, filed Jul. 28, 2017, the disclosure of which is incorporated herein by reference in its entirety.

BACKGROUND

The Internet of things ("IoT") is expected to include over 30 billion objects by 2020. Importantly, the IoT allows for these objects to be detected and/or controlled across networks. Likewise, techniques for detecting the location of objects continue to improve in order to meet the demands and challenges of IoT scenarios. Detection techniques employing location-based services ("LBS") include and are not limited to Global Positioning System ("GPS"), triangulation, cellular and Wi-Fi.

Generally, beacon devices use LBS to broadcast their location or identification to one or more endpoint devices in a system. Receivers on these endpoint devices listen for the broadcasted message including the beacon's location information or identification. In turn, the endpoint devices determine their location accordingly.

In outdoor environments, GPS has been the technique most often utilized by endpoint devices to assist with localization. Moreover, when network connectivity is available, GPS can be used in combination with cellular or Wi-Fi technologies. Meanwhile in indoor environments, techniques such as Near Field Communication ("NFC") and iBeacon protocols employing Bluetooth low energy ("BLE") assist with localization.

Each of the aforementioned localization techniques has its drawbacks. Namely, while GPS may provide reliable location detection information in outdoor environments, the endpoint devices consumes significant power while listening for these messages. In addition, GPS signals can pose security threats since the technology has the possibility of being jammed by third parties. Conversely, while endpoint devices utilizing iBeacon protocols may consume less power and provide accurate measurements in small ranges, the location of the beacon device requires manual configuration. Endpoints typically contact a server to convert beacon identification to location information.

What is desired in the art is a technique and apparatus whereby location information of a beacon in an outdoor environment can be obtained without GPS.

What is also desired in the art is an apparatus exhibiting improved battery life and operating in disconnected operation environment. By "disconnected operations," we imply that the endpoint does not need to communicate with a server (e.g., using networking) to determine its location.

What is further desired is an improved technique for determining a rogue device in an environment.

SUMMARY

The foregoing needs are met, to a great extent, by the application directed to beacon-assisted localization.

One aspect of the application is directed to an apparatus in a system including a non-transitory memory with instructions stored thereon for decoding a message from a beacon device in the system. The apparatus also includes a processor, operably coupled to the non-transitory memory, configured to execute the instructions of receiving, via a deployment server, data about the system including a decryption key associated with the beacon device. The processor is also configured to execute the instructions of listening for a signal from the beacon device transmitted via low energy. The processor is further configured to execute the instructions of receiving the signal from the beacon device including encrypted information. The processor is even further configured to execute the instructions of decrypting the encrypted information including GPS coordinates.

Another aspect of the application is directed to a beacon device in a disconnected system comprising. The beacon device includes a non-transitory memory including instructions stored thereon for sending location information to an endpoint device in an environment. The beacon device also includes a processor, operably coupled to the non-transitory memory, configured to execute the instructions of determining location in the environment via GPS. The processor is also configured to execute the instructions of storing the GPS coordinates in the non-transitory memory. The processor is further configured to execute the instructions of turning off the GPS. The processor is even further configured to execute the instructions of broadcasting, to an endpoint device, information including a beacon ID and the stored GPS coordinates via an encrypted message.

Yet another aspect of the application is directed to a method for navigating in a disconnected system. The method includes the step of listening, at the endpoint device, for signals broadcasted by plural beacon devices using Bluetooth low energy. The method also includes a step of receiving, at the endpoint device, the signals from the beacon devices including encrypted information. The method further includes a step of decrypting, at the endpoint device, the encrypted information from the plural beacon devices including GPS coordinates and an ID. The method even further includes a step of determining, at the endpoint device, a signal strength of the received signals from the plural beacon devices.

There has thus been outlined, rather broadly, certain embodiments in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

In this respect, before explaining at least one aspect of the invention in detail, it is understood that the application is not limited to the details of construction and to the arrangements of the components set forth in the following description or illustrated in the drawings. The application is capable of embodiments or embodiments in addition to those described and being practiced and carried out in various ways. It is to be understood that the phraseology and terminology employed herein, as well as the abstract, are for the purpose of description and should not be regarded as limiting.

Reference in this application to "an aspect,' "one embodiment," "an embodiment," "one or more embodiments," or the like means that a particular feature, structure, or characteristic described in connection with the aspect or embodiment is included in at least one aspect or embodiment of the disclosure. The appearances of, for example, the phrases "an aspect" or "an embodiment" in various places in the specification are not necessarily all referring to the same aspect or embodiment, nor are separate or alternative aspects or embodiments mutually exclusive. Moreover, various features are described which may be exhibited by some aspects and particular embodiments and not by others.

According to the application deploying plural beacon devices in a predetermined, disconnected area results in an inexpensive way to establish infrastructure by which endpoint devices can complete missions with good localization employing low energy. This low cost deployment option achieves GPS-like accuracy with BLE-like consumption. This can be very useful in military operations, specialized deployments, disaster-recovery missions, stadium-like environments, smart cities and IoT deployments.

One aspect of the present application describes a device deployed outdoors that provides periodic signals without any specific location configuration. In one embodiment of this aspect, the device is a beacon. Plural beacon devices may also be arranged in a predetermined area. This may help reduce or eliminate jamming by third party intruders. The beacon devices may be aerially deployed or using a ground-based system. Prior to deployment, the beacon devices are configured with appropriate security credentials, policies, and any supporting security data by the deployment server.

Once deployed, the beacon devices are triggered via an external reset button, battery activation combined with an accelerometer input, or by some other means. For example, upon sensing motion, the beacon activates its GPS receiver and determines its location. The beacon device may also determine its location upon initial deployment in the area. Alternatively, the beacon device may determine its location at a predetermined time controlled by the policies installed by the deployment server. The determined location information is then stored in the beacon device's memory. Subsequently, the beacon device turns off its GPS receiver to conserve battery power. The beacon device can emit its location using Bluetooth Low Energy (BLE), or any other method, preferably a low energy technique. The policies on the beacon device, as provided by the deployment server, can be combined with any sensor input (if available) to determine the frequency of broadcast (e.g., every 30 seconds during the day, every 10 seconds during the night, or every 10 seconds if there is light/activity).

In a further embodiment, GPS coordinates can be recalibrated if the accelerometer detects movement or if other pre-installed policies dictate. For example, the GPS receiver can be used to recalibrate the beacon device periodically, after a very long periodicity. Unlike iBeacon technology however, the beacon device of the instant application broadcasts signals including both its ID and previously determined location (via GPS). This allows devices listening for the beacon to determine their location without having to contact a server to translate the beacon id to a location.

In another aspect of the application, the endpoint devices are deployed into the system after being configured with policies provided by the deployment server. In so doing, an endpoint device deployed in the system receives the beacon device's messages in order to determine its location in relation thereto. The endpoint device uses very little energy since it does not need to activate GPS. For example, BLE can use tens of mW of power for operation. GPS receivers (and network interfaces like WiFi or GSM) typically use hundreds of mW of power for operation.

In an embodiment, security credentials are employed between the beacon devices and endpoint devices. The security credentials may be provided by the deployment server in advance of configuration. For example, endpoint devices are provided with PRE key(s) for the beacon devices in the area of operation. Upon decrypting the messages, the GPS coordinates of the beacon device is used by one or more applications on the endpoint device to complete tasks including navigation, determining rogues, strategic shopping and obtaining information.

Yet another aspect of the application describes a method for navigating through disconnected operations. Disconnected operations is understood to mean that the endpoint (and the beacon device) do not need to be connected to a server for operation. In particular, the endpoint does not need to talk to a server to determine its location, and can do so based on receptions from the beacon device. For example, the endpoint devices, such as smart phones, tablets or wearable, can cache map tiles of the target area in advance of deployment. An application running on the endpoint device overlays the received localization information upon the cached map tiles in the target area. In turn, the endpoint devices use the localized details from the beacon device to navigate the area.

BLE

Wireless technologies readily available on most mobile devices can be divided into Local Area Wireless Communication (LAWC) technology and Wide Area Wireless Communication (WAWC) technology (elements of the aforementioned names are borrowed from the computer technology terminology Local Area Networks and Wide Area Networks, although no inferences should be made between the two technologies). The term 'communication' in reference to LAWC and WAWC can be two-way communication or one-way communication. The communication medium may be sound waves, electromagnetic energy such as radio waves, light waves and the like. An example of the LAWC technology is Bluetooth™ (BT), but it is understood that the use of Bluetooth technology herein is merely exemplary and that other communication technologies such as, but not limited to, RFID, NFC IrDA, UWB and others may be employed in place of Bluetooth. Examples of WAWC include cellular communication, WIFI and satellite communication. In some cases, the distinction between LAWC and WAWC may not be so clear. However, the given definitions will suffice to distinguish between these technology types as employed in the application.

Bluetooth Low Energy (BLE) is a feature of Bluetooth 4.0 wireless radio technology. This is primarily geared towards low-power, low-latency applications for wireless devices within a short range. Typically, the range is up to 50 meters/160 feet. This facilitates a wide range of applications and smaller form factor devices.

BLE consumes 10 to 20 times less power than Classic Bluetooth technology to locate other radios. Apart from Classic Bluetooth using 32 of its 79 channels at 1 MHz wide to locate channels, BLE uses only 3 of its 40 channels, 2 MHz wide to obtain simpler chipsets. Specifically, these 3 BLE channels are located exactly between the Wireless LAN channels. They are used for device discovery and connection setup. These channels (also known as "advertising" channels) are used to search for other devices or promote its own presence to devices that might be looking to make a connection. BLE has to switch "on" for just 0.6 to 1.2 ms to scan for other devices using its three advertising channels. Meanwhile, Classic Bluetooth, instead, requires 22.5 ms to scan its 32 channels.

General Architecture

Figure 1A:
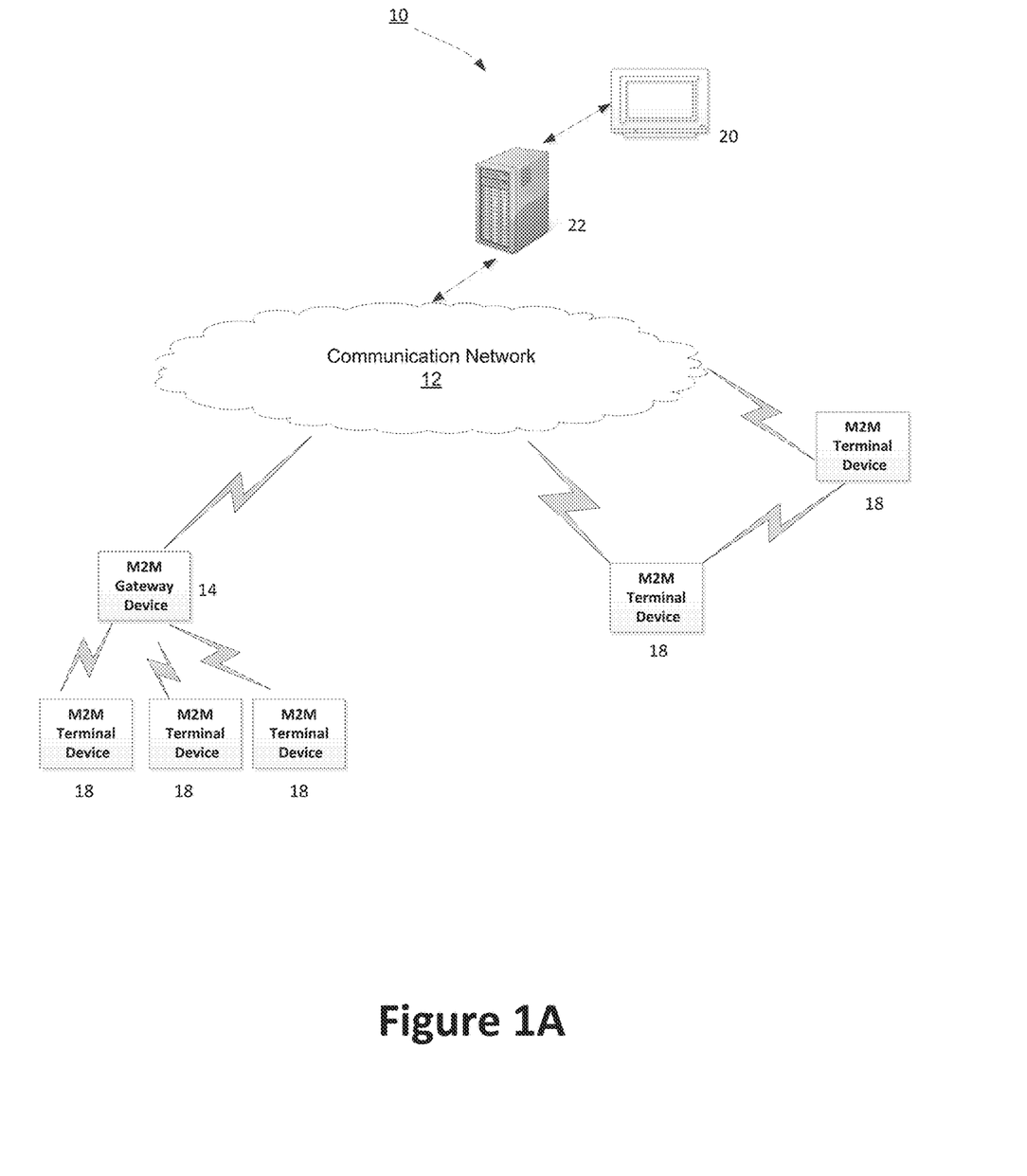
FIG. 1A illustrates a machine-to-machine (M2M) or internet of things (IOT) communication system according to an aspect of the application.

FIG. 1A is a diagram of an exemplary machine-to-machine (M2M), Internet of Things (IoT), or Web of Things (WoT) communication system 10 in which one or more disclosed embodiments are implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. This network may be used to deploy policies to beacon and endpoint devices prior to being deployed into a disconnected environment. Alternatively, the communication network 12 may be available and transmit policies in real-time to the beacon and endpoint devices. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Service Capability Server (SCS) with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send data, via the communication network 12 or direct radio link, to an M2M application 20 or M2M devices 18. The M2M devices 18 may also receive data from the M2M application 20 or an M2M device 18. Further, data and signals may be sent to, and received from, the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Figure 1B:
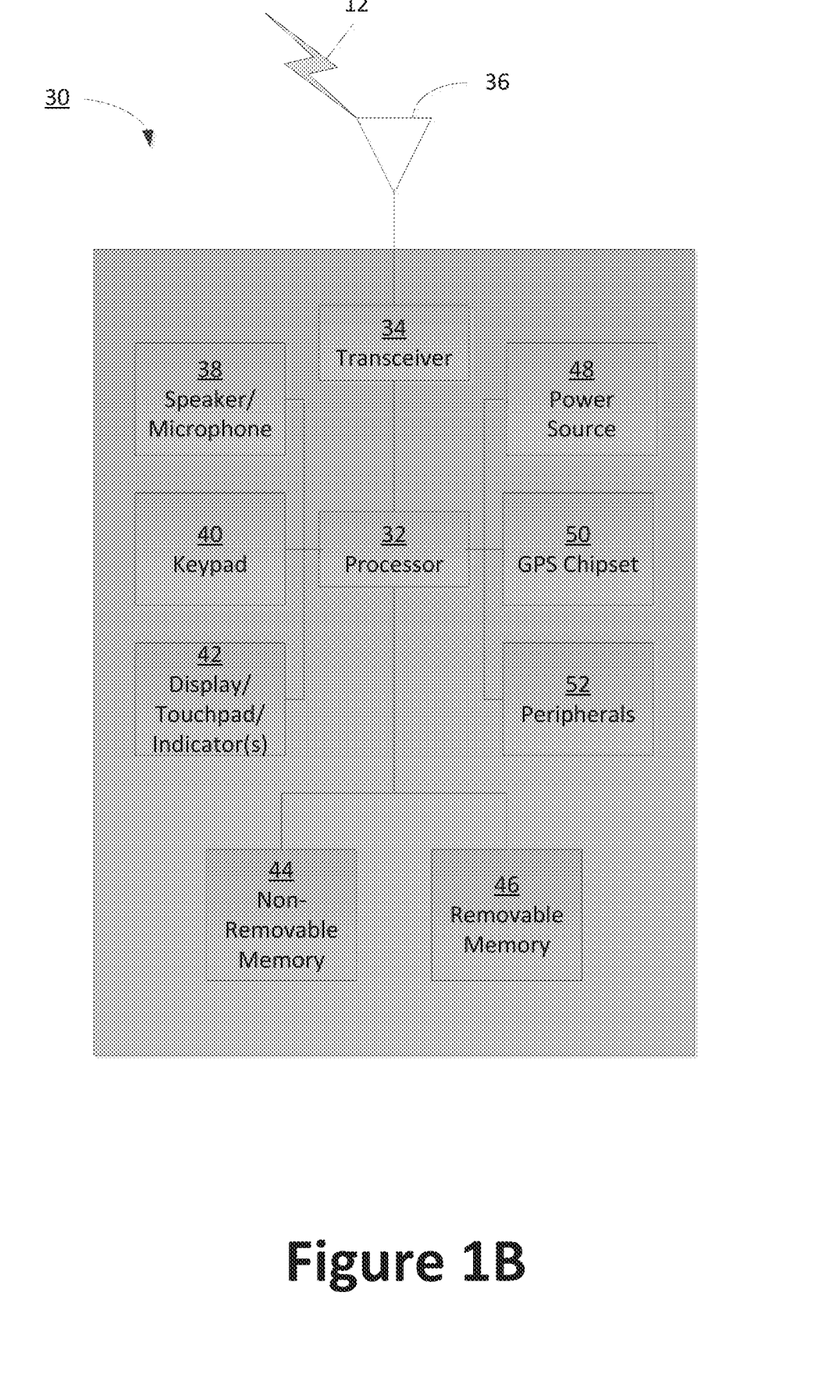
FIG. 1B illustrates a service M2M service platform according to an aspect of the application.

FIG. 1B is a system diagram of an exemplary M2M device 30, such as a M2M terminal device 18 or an M2M gateway device 14. In this application, the M2M device 30 can be a beacon or endpoint device. As shown in FIG. 1B, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display may further include a graphical user interface. It will be appreciated that the M2M device 30 may include any sub-combination of the foregoing elements while remaining consistent with an embodiment. The M2M device 30 may also be employed with other devices, including for example originators and hosting/transit common service entitied (CSEs) as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1B depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22 or other M2M terminal devices 18. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1B as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
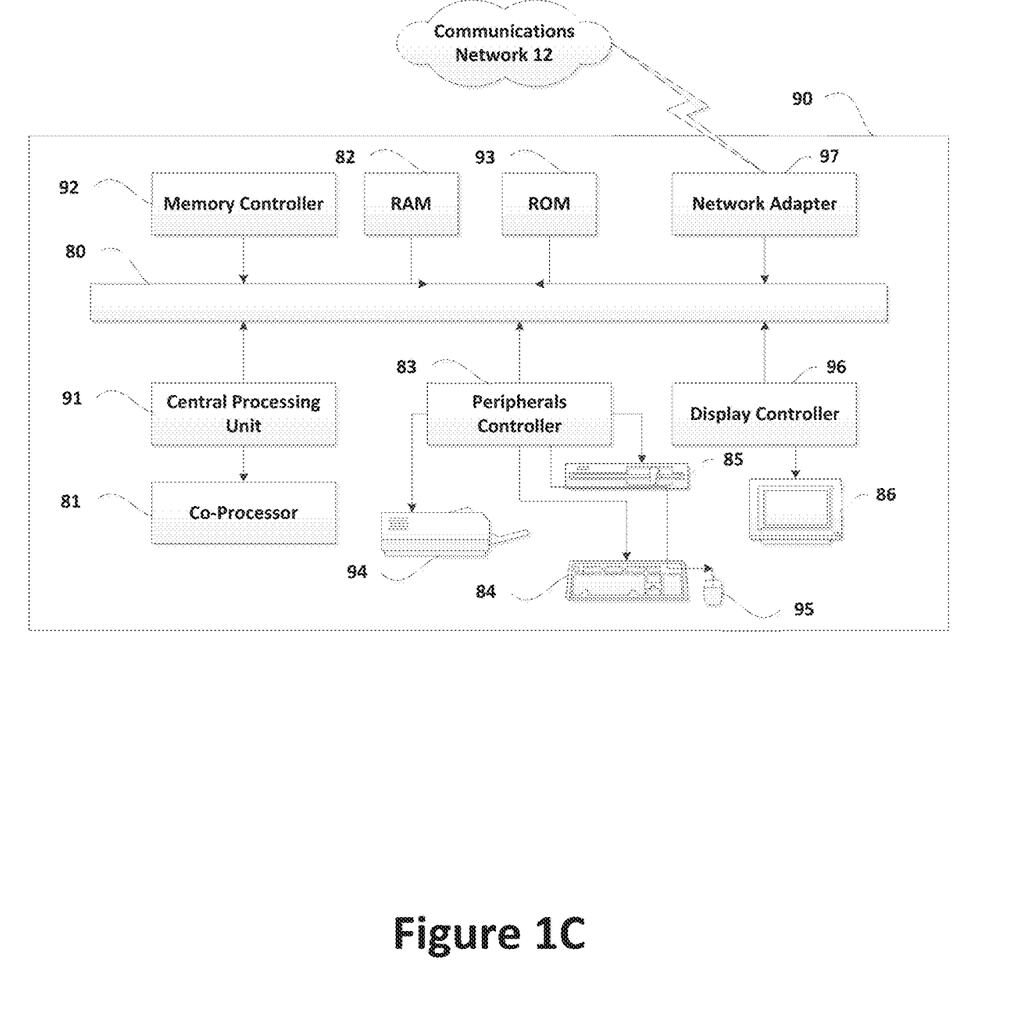
FIG. 1C illustrates a system diagram of an exemplary M2M device according to an aspect of the application.

FIG. 1C is a block diagram of an exemplary computing system 90 on which, for example, the M2M service platform 22 of FIG. 1A may be implemented. As will be described in more detail below, the computing system 90 may be, for example, a deployment server on the backend that provides policies to the beacon and endpoint devices. The computing system 90 may also be housed in the endpoint device or in the beacon device. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can only access memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Figure 5:
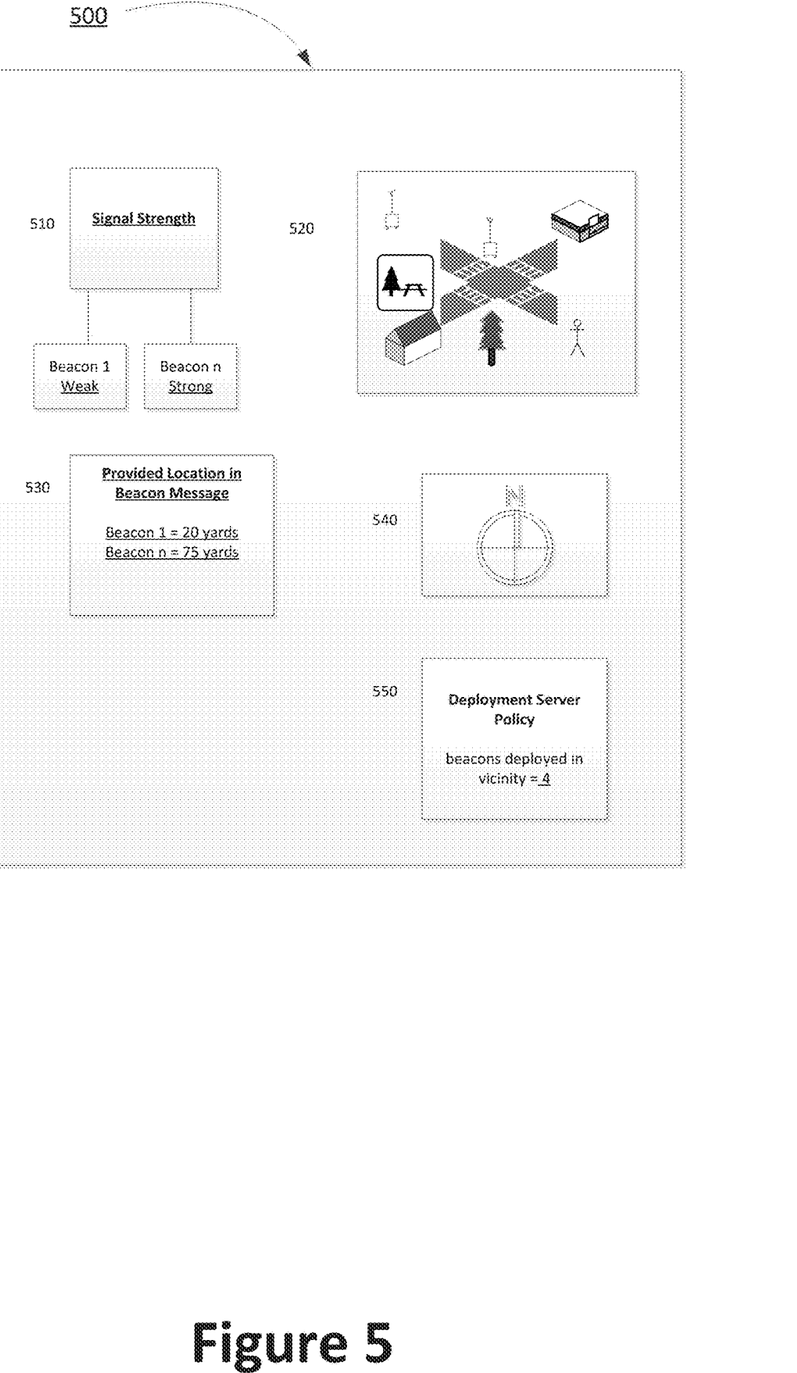
FIG. 5 illustrates a graphical user interface (GUI) on an endpoint device according to an aspect of the application.
Figure 6:
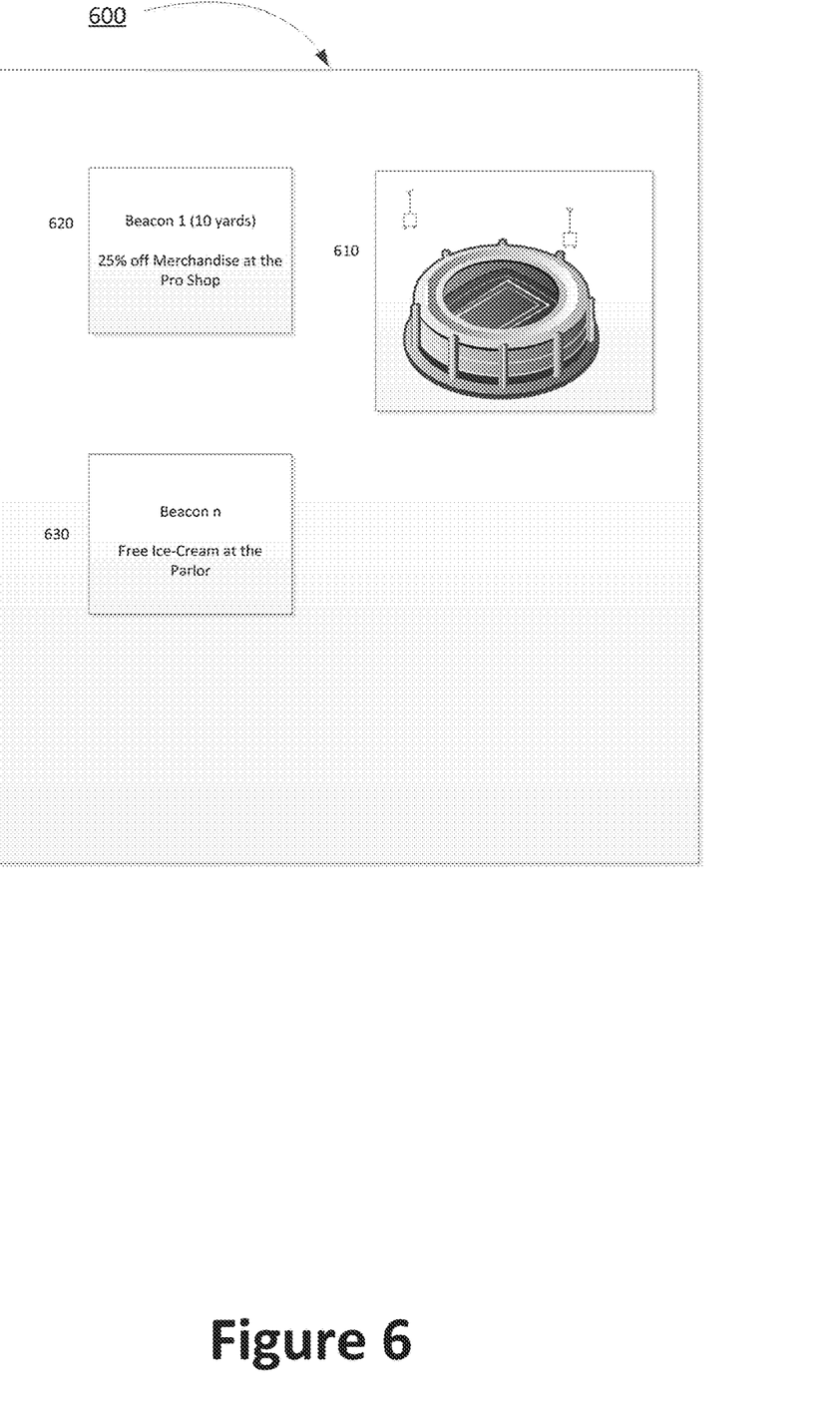
FIG. 6 illustrates a graphical user interface (GUI) on an endpoint device according to another aspect of the application.

Display 86, which is controlled by display controller 96, is used to display visual output generated by computing system 90. Such visual output may include text, graphics, animated graphics, and video. Display 86 may also include a graphical user interface (GUI) as shown in FIGS. 5 and 6 described in more detail below. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A.

Pre-Configuration of Beacon and Endpoint Devices

Figure 2:
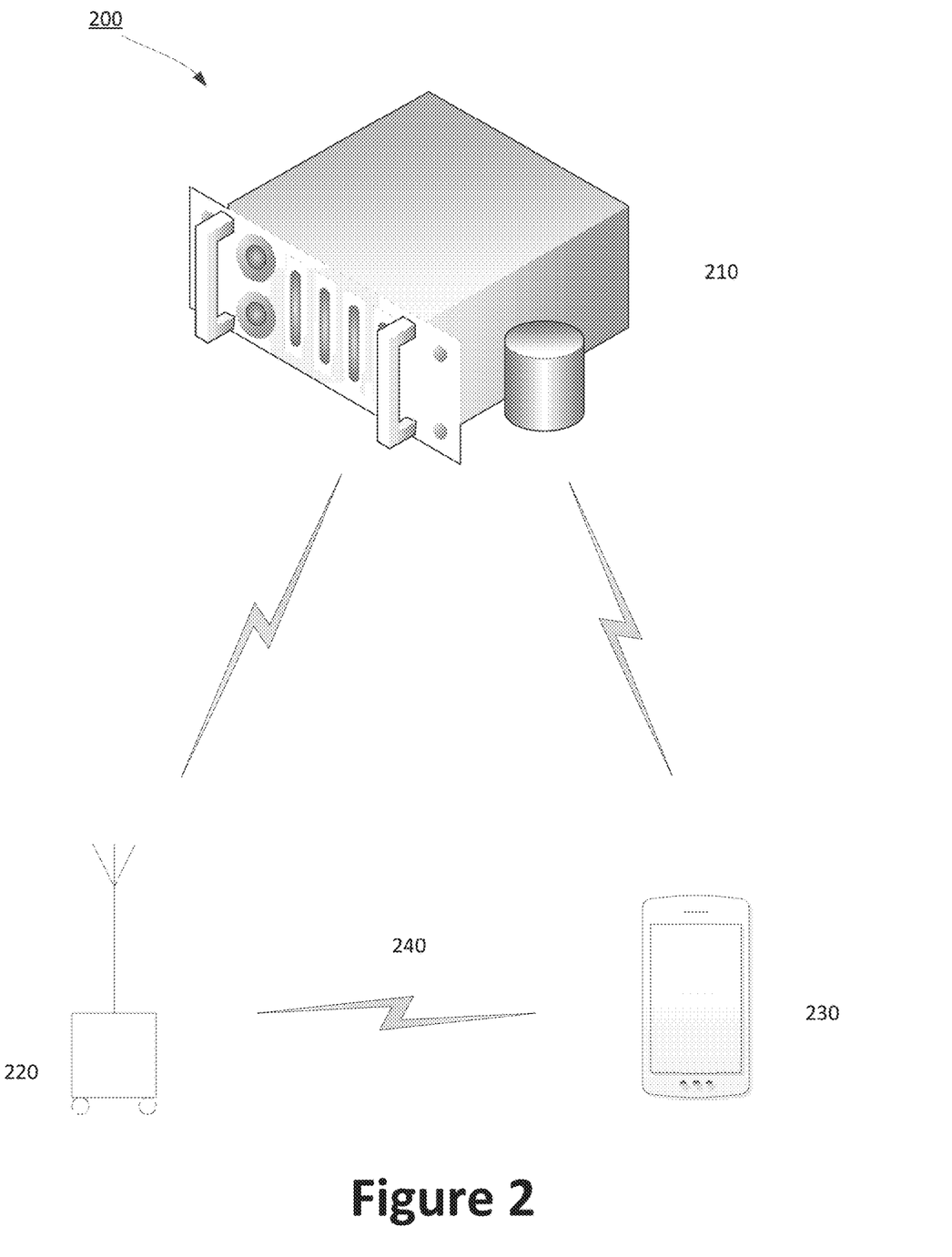
FIG. 2 illustrates a system including a deployment server, beacon device and endpoint device according to an aspect of the application.

One aspect of the application illustrates a distributed system 200 in FIG. 2. The deployment server 210 provides policies to the beacon device 220 and the endpoint device 230. The policies may be provided to the beacon device and endpoint device prior to deployment. Providing the policies ahead of deployment is important in embodiments where the devices are deployed to disconnected systems. In such instances, the information can be downloaded to a chip that is subsequently embedded into the beacon device. In an alternative embodiment, the information can be provided via a wired connection. In a further alternative embodiment, the information can be provided to a wireless receiver on the beacon device that is mostly turned off during operation.

Conversely, the policies from the deployment server 210 may be provided in real-time or after deployment to the system 200. This alternative is envisaged when a network connection to the beacon device 220 is available in the deployed system. In addition to policies, the deployment server 210 may also provide security keys as will be discussed in more detail below. After deployment, and upon obtaining its location information, the beacon device(s) 220 broadcasts the obtained location information via a suitable technique like BLE to endpoint device(s) 230. With regard to the endpoint devices 230, the deployment server 210 could also provide information, such as for example, maps of the operational area to support disconnected operations, and policies for what can be done and when.

In the system 200, the beacon device 220 may include plural components in addition to those discussed above in FIGS. 1A-C. Specifically, the beacon device may include a battery, a GPS component, an accelerometer, a computing unit, memory, secure memory, and a clock. The beacon device may also include dedicated chips for encryption. In an exemplary embodiment, the beacon device includes a wireless transmitter. Moreover, the beacon device 220 may have a BLE transmitter. As discussed above, BLE consumes less battery power than Classic Bluetooth.

In one embodiment, the beacon device 220 may not include a wireless receiver. This example assumes any policies and/or keys are pushed to the beacon device 220 prior to deployment to a disconnected system. As a result, the beacon device can reduce and conceivably prevent cyber-attacks. If a receiver was made available, it can periodically operate to conserve battery power. The deployment server would be able to update policies and install/remove encryption keys according to the needs of the system.

The beacon devices 220 could also include additional sensors, e.g., light sensing, temperature sensing, etc. The policies from the deployment server could use these sensor inputs to make reasonable assessments of location in the system. The beacon devices 220 may be sealed with no external I/O. Alternatively, they may have a small "reset" or activation button. In a further alternative, the beacon devices may have status indicators.

In the system 200, the endpoint devices 230 are general-purpose endpoints, such as for example, smartphones, tablets or wearable devices. They can run additional software and can communicate with a server. In our preferred method, the endpoints communicate with the deployment server before deployment and can then operate without talking to a server during the mission/regular operation. However, in other scenarios, communication with a server during operation is also possible. An exemplary endpoint is shown in FIGS. 1A-C and the accompanying hardware and software is described therein.

Encryption of Messages

According to an aspect of the application, a beacon message 240 includes, but is not limited to, the following information: the beacon id (e.g., beacon device MAC address or UUID), data (GPS coordinates) and, possibly, verification information. In an embodiment, the beacon messages 240 can be encrypted/signed. With encryption, the message or portions of the message are encrypted using (one of) the (public) keys deployed on the beacon device. If multiple public keys are used by the beacon device, some information about which public key is being used may need to be advertised. For example, if the policy deployed on the beacon device automatically determines the public key used, and the endpoint is aware of this (e.g., because on a specific day, only public key P is used), no extra information is needed in the beacon message. If, however, the policy allows the beacon device to choose a public key when in operation, the information about the public key (e.g., its identification number, or a hash of that value) is included in the beacon message.

Generally, using encryption/signing/verification with beacon messages serve three distinct purposes: (i) confidentiality—i.e., only authorized endpoints can see the contents we want to protect, (ii) beacon message verification—i.e., the beacon message is valid, and (iii) reduce the risk of replay attacks. Which of the above three purposes are desired determines what portions of the message are encrypted/signed.

If confidentiality is desired, the complete message (except possibly the beacon ID) is encrypted and sent out. For beacon message verification, a hash (e.g., MD5 hash) of the message is encrypted and sent as part of the verification information component of the beacon message. For reducing the risk of replay attacks, some information 't' that changes and is known to the endpoint and beacon is included in the verification component of the beacon message. This acts as a nonce. One example of 't' is the current time (or valid-until time). Another example is the output of a counter. Yet another example is a portion of a random string that is deployed on the beacon device and the endpoint, where the portion of the string is chosen in some way pre-determined by the deployed policy.

In an exemplary embodiment, secure authentication of beacon messages 240 is provided. The deployment server 210 generates the private and public keys for the beacon device(s) 220 and is deployed with the required set of keys. For example, the beacon devices can be deployed with only public keys. Multiple public keys can be stored on the beacon devices. The keys may be the same for some or all of the beacon devices in an area. Additionally, depending on the type of deployment, policies can be configured on the beacon device(s). These policies can be used to (de)activate the beacon devices, change their operational parameters, etc., as is used with several other systems today. Some optional data may also be stored on the beacon device.

According to an aspect of the application, the messages from the beacon device 220 to the endpoint device 230 can be encrypted. If the message is encrypted, the endpoint uses the policy provided by the deployment server 210 to determine which portions of the message are encrypted and what method is being used for message verification. The following encryption/decryption techniques can be implemented in the architectures described above. For example, in an individual key system, each user has a pair of a private key and public key. User A encrypts the data by means of a public key for user B (individual encryption key for the user B).

User A may also encrypt data via a public key for user C (individual encryption key for the user C).

In a common key system, each user shares a pair of a private key and a public key common to the users. Namely, user A encrypts a file by means of a public key common to the users. This technique however may increase the likelihood of unwanted intrusions by third parties who obtain the common public key.

Proxy Re-encryption (PRE) is a technique for securely transforming ciphertext encrypted under one public key pair K1 to a new ciphertext as if the plaintext were encrypted under a different key pair K2. In a PRE system, each user has a pair of a private key and public key. The keys vary among the users similar to the individual key system. However, user A may encrypt the data (e.g., with X) via its public key or a public key for a broker that manages a group of users. A third party proxy authority generates the re-encryption key (re-encryption key X,Y) to re-encrypt the encrypted data (encrypted with X) uploaded by user A to a different, encrypted form (encrypted with Y) which can be decrypted only by each user/receiver with a private key Y. This technique is generally preferred because a broker uses a re-encryption key to re-encrypt one ciphertext to a ciphertext, which can be decrypted only by each user with a specific private key.

Figure 3A:
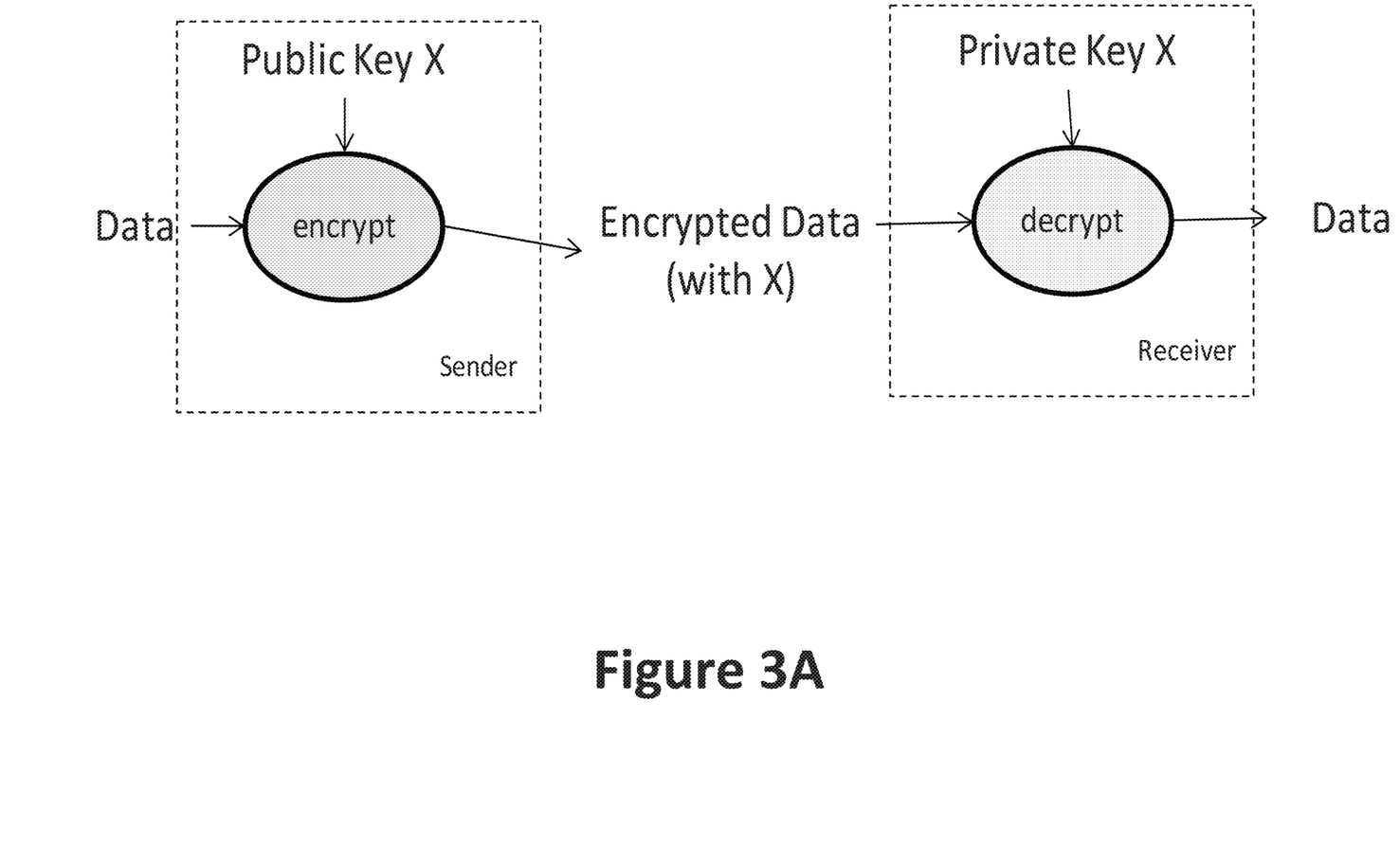
FIG. 3A illustrates a public key encryption technique.
Figure 3B:
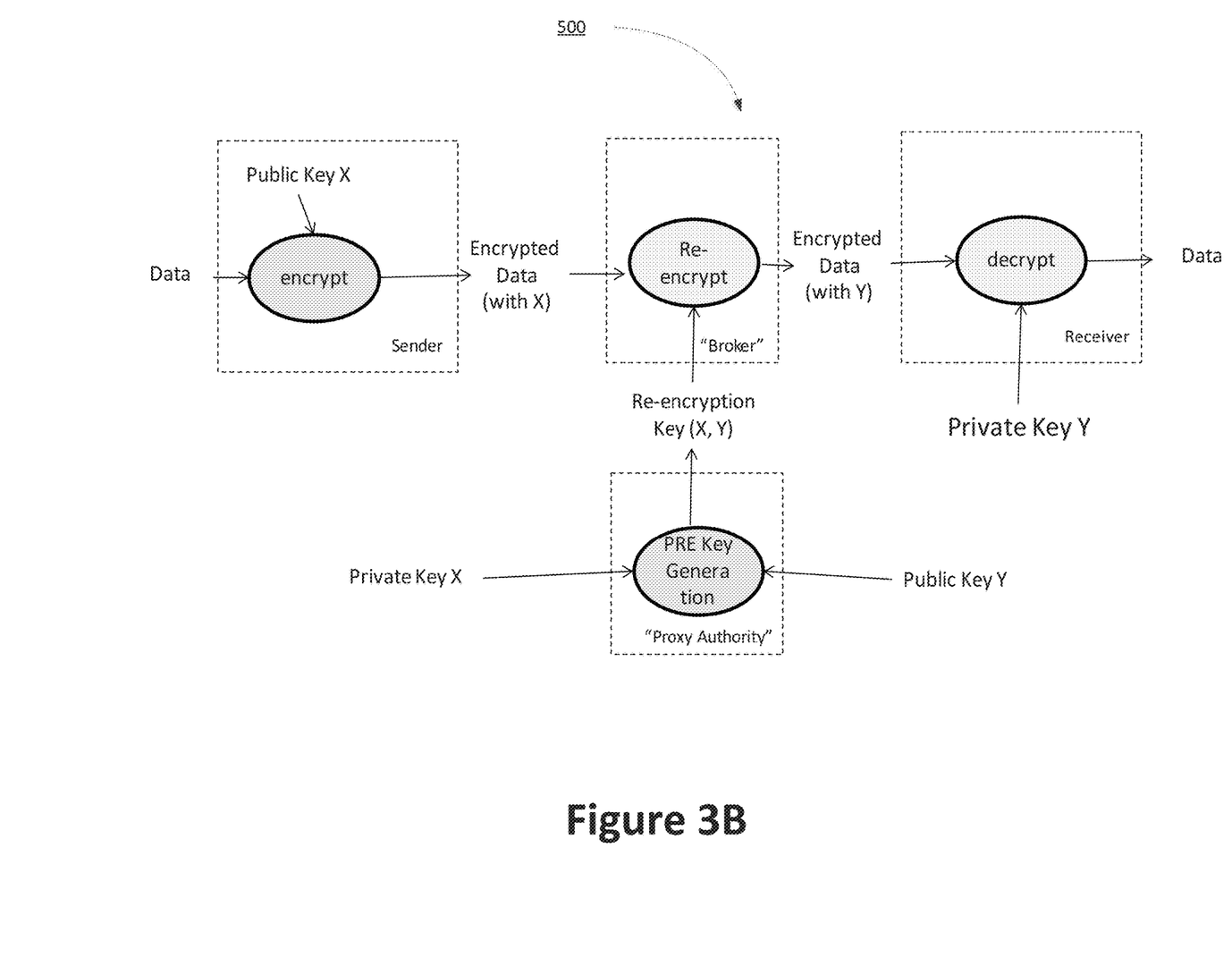
FIG. 3B illustrates a proxy re-encryption (PRE) technique.

One example of the PRE includes normal public-key encryption with public-private key pair X is shown in FIG. 3A. In another PRE embodiment as shown in FIG. 3B, the policy authority capability can be done by the deployment server 210 and the broker functionality can be done by the endpoint device 230. Key Y is the endpoint key pair, and for disconnected operation, the re-encryption key (X, Y) for each beacon device key X is pre-loaded on the endpoint device 230. The endpoint device 230 then decrypts the message. If a nonce is being employed, the endpoint may have to decrypt multiple messages to ensure authenticity. For example, with a nonce that represents a universal "valid until" time, one message is sufficient. If a counter is being employed, two or more messages may be needed.

Figure 3C:
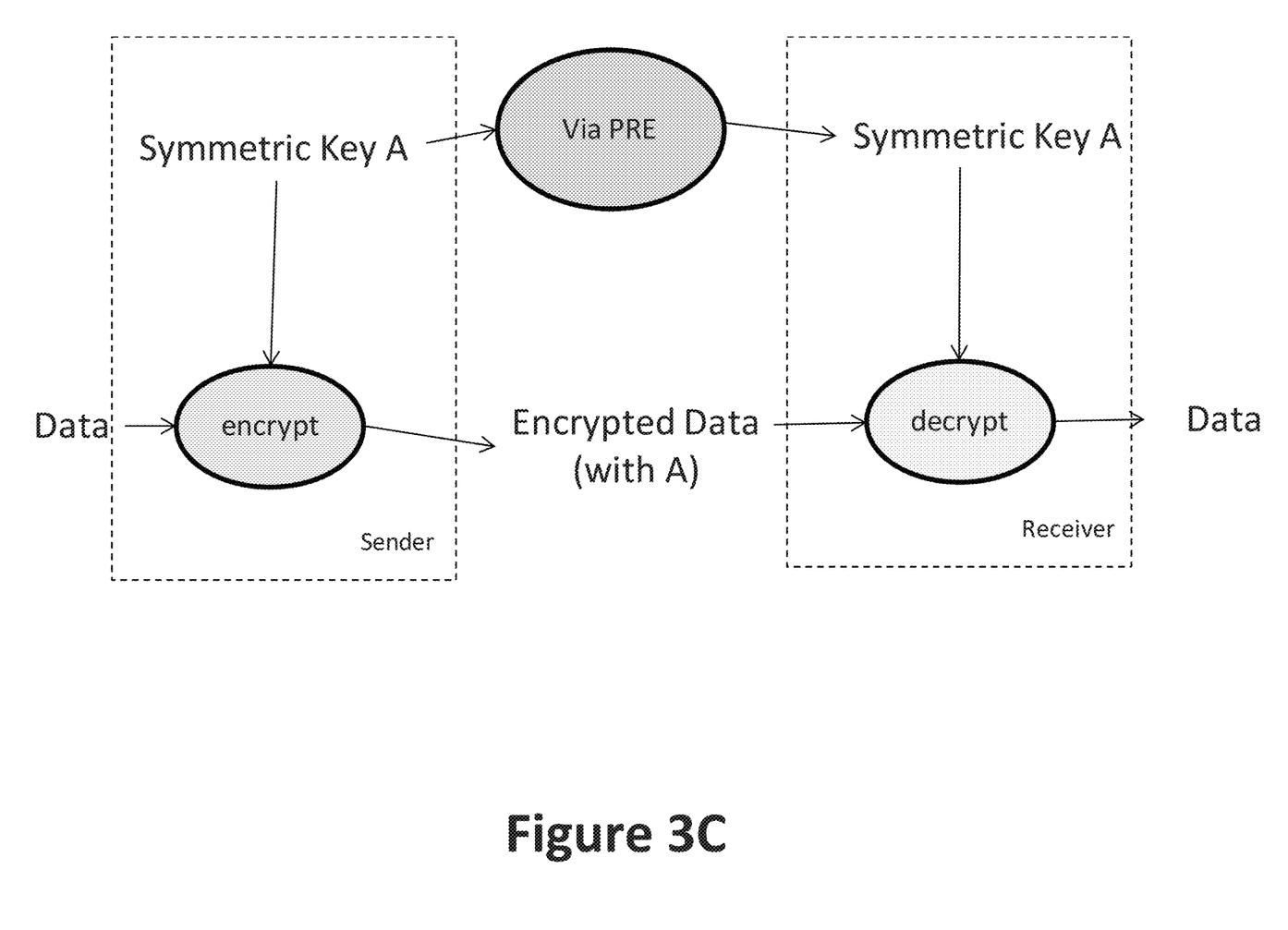
FIG. 3C illustrates a hybrid PRE technique.

Alternatively, PRE can be used in hybrid mode as shown in FIG. 3C. Here a symmetric key (e.g., A) is used for most of the encryption. The symmetric key is securely exchanged between the sender and receiver. If a hybrid scheme is used, in addition to the encrypted portions of the message (encrypted now with a symmetric key), the symmetric key is also broadcast, encrypted with the public key of the beacon device. The symmetric key can be changed every so often based on policy.

Use Cases for Deployed Endpoint and Beacon Devices

Figure 4:
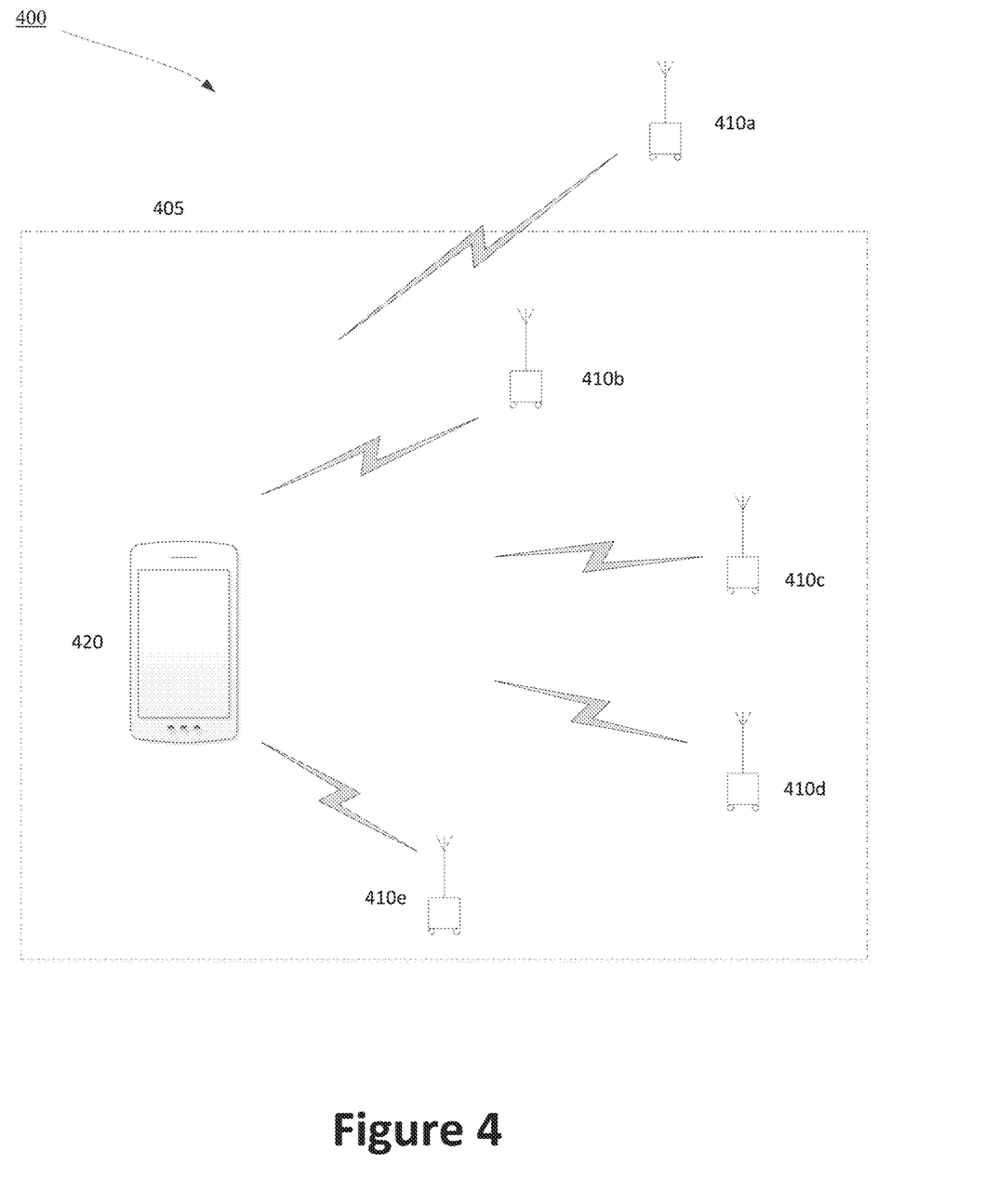
FIG. 4 illustrates a use case for an endpoint device detecting locations of beacon devices in a system according to an aspect of the application.

According to yet another aspect of the application, the architectures described above are applicable to system 400 illustrated in FIG. 4. Specifically, one or more beacon devices 410a-e and endpoint device(s) 420 may be available in the network 400. While only one endpoint device is depicted, it is understood to exemplify one or more endpoint devices. In an embodiment, the network may have little or no network connectivity to a server (e.g., disconnected).

In an embodiment, the beacon devices 410a-e may be deployed at some time 't' before an actual military operation. The beacon devices may begin to locate its coordinates as soon as being deployed at time 't'. Alternatively, specific sensors, e.g., a high frequency detection sensor may be part of the beacon device, may be included in the beacon device which allows it to remain dormant until activated. Activation may be at some time 't+1'. In an exemplary military embodiment, activation of the beacon device's GPS is done by the troops when deployed. At 't+1', the beacon device(s) obtain its coordinates. The beacon device turns off its GPS to conserve battery power. After, the beacon device begins to broadcast messages including its location in the system.

Before any troops are physically deployed into the deployment area 405, e.g., dotted line, endpoint device(s) 420 is configured with appropriate polices and security keys to obtain coordinates from the beacon devices. This is particularly useful in situations where network connectivity is suspicious and subject to third party malicious attack. In addition to policies and security keys, the endpoint devices may also be configured with a map of the deployment area 405 to assist with navigation.

Upon deployment, the endpoint devices listen for the beacon device's message. Preferably, the message is transmitted in BLE to conserve power. The message can be consistently or periodically transmitted based upon predetermined battery power policies. Upon receiving a message from the one or more beacon devices 410a-e, the endpoint device(s) 420 decodes the message and obtains the GPS coordinates. If there are any security credentials, as discussed above, the endpoint device will use its decryption key to decrypt the beacon device's encrypted message. In an exemplary embodiment, PRE security protocols are configured on the devices. The endpoint device then shares the obtained GPS coordinates with the software/apps located thereon. The user is then able to configure its endpoint device location in relation to the beacon device and navigate to a desired destination in the deployment area 405.

In an embodiment, the endpoint device may receive messages from more than one beacon device in the deployment area 405. In an exemplary embodiment, the beacon devices 410b-e may be located at different distances from the endpoint device 420 in the deployment area 405 and each emits a signal with a different signal strength. The endpoint device can navigate toward the beacon device broadcasting the strongest signal. In an exemplary embodiment, 410e conceivably emits the strong signal given its proximity to the endpoint device 420.

In another aspect of the application, the endpoint device can obtain beacon messages from plural beacon devices. The endpoint device obtains the coordinates for each beacon device. The beacon device maps the coordinates shown in the beacon message and correct its location accounting for the signal strength of each received signal. Likewise, the endpoint device can validate its location by correlating the locations received from the beacon devices with their signal strengths.

According to a further embodiment, the endpoint device is able to correlate messages from multiple beacons to verify authenticity. For example, if the deployment server indicates a policy that 'x' beacon devices have been deployed in an area of operation, the endpoint device can verify that an appropriate number 'x' of beacon devices (corresponding to the density) are visible at any location. FIG. 4 depicts four beacon devices 410b-e located in the deployment area 405.

According to an aspect of the application, the endpoint device may include a graphical user interface (GUI) on its display. An exemplary embodiment of the display is illustrated in FIG. 5. Here, the GUI 500 includes a deployment server policy 550. This policy may be pre-configured prior to deployment. The deployment server policy 550 displays 4 beacon devices deployed in the vicinity 405. The endpoint device confirms that it has received 4 messages from beacon devices. If it does, the endpoint device can reasonable assume that it can accept the messages from the plural beacon devices. This strategy may be used independently or in combination with the security policies discussed above.

In yet another aspect of the application, the endpoint device is configured to identify suspicious or malicious third party beacon devices. Specifically, the endpoint device correlates signal strength transmitted by multiple beacon devices with the coordinates provided in their beacon message (e.g., based on known propagation models). As shown in FIG. 4, the area 400 includes five beacon devices. Four beacons are located inside the deployment area 405 (410b-e) and one is located outside (410a). In an embodiment, beacon device 410a may send a message providing inaccurate coordinates to the endpoint device. The endpoint device evaluates and determines the detected signal strength is very poor. This is based upon its true location further from any other beacon device 410b-e. The endpoint device may also compare the plural signal strengths and coordinates received from the beacon devices against one another. This helps identify a fraudulent or malicious beacon device in the area. The endpoint device can inform the deployment server if it has a network connection. Additionally, the endpoint device can discard beacon device 410a from its data when correcting its location or navigating to a landmark in the deployment area 405.

FIG. 5 helps explain this example in more detail. As shown in GUI 500, the signal strength in box 510 for beacon 1 (e.g., 410a) is weak. Meanwhile, the signal strength for beacon n (e.g., 410b-e) is strong. Box 520 shows navigation software that populates the coordinates in the system (accounting for both inside and outside a deployment area 405). Box 540 provides a compass to guide the user. In this example, the beacon device closest to the user is the understood to be the malicious beacon device (i.e., poor signal and false coordinates provided).

The signal strengths of beacons 1 and n are correlated against the coordinates in the beacon message shown in box 530. For example, beacon 1 indicates a location 20 yards away, whereas beacon n indicates a location 75 yards away. The veracity of beacon 1's location is compared with its signal strength and against the other beacons. Based on this assessment, Beacon 1's location information can be discarded when deciding a specific beacon to navigate to, or when correcting the endpoint device's location in view of the sampled beacons.

According to even another aspect of the application, beacon devices may be deployed to a stadium some time 't' before an event. Again, FIG. 4 illustrates an exemplary architecture whereby the endpoint device is within the deployment area 405, e.g., stadium. The deployment may have occurred during stadium construction or some time thereafter. The policies deployed on the beacon device in this use case are time dependent. That is, a different encryption-decryption key pair can be employed depending upon the date or time of day. Accordingly, specific messages may be send to recipients based upon the particular schedule event (e.g., basketball vs. hockey vs. Circus).

In this example, before entering the stadium, either at home or when standing in line, the endpoint devices communicate with the deployment server and download suitable decryption keys. It is envisaged that this information can be pushed to the endpoint device on-demand. The endpoint devices also have downloaded a specific application (e.g., stadium app) that receives location-based incentives or information on a GUI 600. The GUI 600 may include a map 610 of the stadium and provide general locations of the beacon devices. Upon entering the stadium, the app on the endpoint device listens to the beacons transmitted from the beacon device. The location coordinates of the beacon device are decrypted and made available to the stadium app. Based on the particular beacon device, the stadium app activates pre-installed incentives based on location. For example, when the endpoint device moves within a proximity of a first beacon, a prompt 620 appears on the GUI offering a 25% discount off merchandise at the pro shop. When the endpoint devices moves closer to beacon n, a prompt 630 appears on the GUI offering free ice-cream at the parlor. In some embodiments, the app may also provide a prompt to provide turn-by-turn directions to the user to the selected destination in prompts 620, 630. Even further, the endpoint device may also be able to customize the types of offers they receive by filtering only to food, free prizes, restrooms, etc.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus comprising:
a non-transitory memory including instructions stored thereon for decoding a message from a beacon device in a system;
a display; and
a processor, operably coupled to the non-transitory memory and the display, wherein the processor is further configured to execute the instructions of:
receiving, via a deployment server, data about the system including a decryption key associated with the beacon device;
listening for a signal from the beacon device transmitted via low energy;
receiving the signal from the beacon device including encrypted information;
decrypting the encrypted information including GPS coordinates;
receiving a signal including encrypted information from another beacon device in the system;
decrypting the encrypted information including GPS coordinates of the other beacon device;
determining a signal strength of the received signals from the beacon device and the other beacon device;
displaying, on a graphical user interface on the display, a policy from the deployment server of a number of beacon devices in the system; and
determining the received signals from the beacon device and the other beacon device match the number of beacon devices in the displayed policy.

2. The apparatus of claim 1, wherein the processor is further configured to execute the instructions of:
determining a strongest signal received from the beacon device and the other beacon device; and
navigating to one of the beacon device and the other beacon device exhibiting the strongest signal.

3. The apparatus of claim 1, wherein the processor is further configured to execute the instructions of:
mapping the GPS coordinates received from each of the beacon device and the other beacon device; and
correcting location of the apparatus based upon the GPS coordinates and signal strength.

4. The apparatus of claim 1, wherein the processor is further configured to execute the instructions of:
  comparing the signal strength with the GPS coordinates; and
  identifying a weaker signal strength for one of the beacon device and the other beacon device providing GPS coordinates closer to the apparatus than the other beacon device.

5. The apparatus of claim 1, wherein the encrypted information includes a beacon ID.

6. The apparatus of claim 1, wherein the system is disconnected.

7. The apparatus of claim 1, wherein the decrypting is proxy re-encryption.

8. The apparatus of claim 1, wherein the apparatus is selected from a smart phone, tablet or wearable device.

9. The apparatus of claim 1, wherein the signal is received at a frequency based upon periodicity, time of day, activity or combinations thereof.

10. The apparatus of claim 1,
  wherein
  the low energy is Bluetooth, and
  the processor is further configured to execute the instructions of:
    navigating toward the beacon device, and
    displaying incentives on the display based upon the decrypted information.

11. A method for navigating in a disconnected system comprising:
  listening, at an endpoint device, for signals broadcasted by plural beacon devices via Bluetooth low energy;
  receiving, at the endpoint device, the signals from the plural beacon devices including encrypted information;
  decrypting, at the endpoint device, the encrypted information from the plural beacon devices including GPS coordinates and an ID;
  determining, at the endpoint device, a signal strength of the received signals from the plural beacon devices;
  displaying, on a graphical user interface, a policy from a deployment server for a number of beacon devices in the disconnected system; and
  determining the received signals from the plural beacon devices match the number of beacon devices in the displayed policy.

12. The method of claim 11, further comprising:
  mapping the GPS coordinates received from each of the plural beacon devices; and
  correcting location of an apparatus based upon the GPS coordinates and signal strength.

13. The method of claim 11, wherein the endpoint device is selected from a smart phone, tablet or wearable device.

* * * * *